United States Patent                                             [11] 3,579,001

| [72] | Inventor | Yves F. Pelenc |
| | | La Tronche, France |
| [21] | Appl. No. | 866,911 |
| [22] | Filed | Oct. 16, 1969 |
| [45] | Patented | May 18, 1971 |
| [73] | Assignee | Merlin Gerin, Societe Anonyme |
| | | Grenoble, France |
| [32] | Priority | Nov. 7, 1968 |
| [33] | | France |
| [31] | | 173,022 |

[54] LINEAR MOTOR HAVING RADIAL ARMATURE PLATES
8 Claims, 3 Drawing Figs.

[52] U.S. Cl. ..................................................... 310/13
[51] Int. Cl. ...................................................... H02k 41/02
[50] Field of Search .......................................... 310/12-
—14; 318/121, 135; 124/3; 104/148, 148 (LM)

[56] References Cited
UNITED STATES PATENTS
| 1,422,427 | 7/1922 | Fauchon-Villeplee ....... | 310/13X |
| 2,112,264 | 3/1938 | Bowles et al. .................. | 310/13X |

*Primary Examiner*—D. F. Duggan
*Attorney*—Stevens, Davis, Miller and Mosher

ABSTRACT: Compact linear motor of high thrust having an annular magnetic field structure with a plurality of radially directed air gaps in which extend armature plates of the motor. The armature plates are subjected to the magnetic flux produced by the field structure resulting in axially directed forces which displace the armature with respect to the field structure.

Patented May 18, 1971 3,579,001

Y. E. PELENC
INVENTOR

BY Stevens, Davis, Miller & Mosher
ATTORNEYS

Patented May 18, 1971

LINEAR MOTOR HAVING RADIAL ARMATURE PLATES

The invention relates to a linear induction motors comprising a magnetic field structure cooperating with an armature structure to produce linear relative movement of these structures.

The French Pat. No. 1,474,072 discloses a linear induction motor in which a movable magnetic field structure cooperates with two rail-shaped stationary armatures arranged laterally on either side of the field structure. For certain special applications, there is a need for linear motors of small size, high thrust and relatively slow speed. Decreasing the pole pitch to reduce the speed of travel of the moving magnetic field and thereby the speed of displacement of the moving unit is greatly limited by the dimensions of the slots which receive the conductors of the field winding a decrease in the number of which would in its turn result in a proportional reduction in the thrust. The two desired effects are therefore contradictory.

An object of the present invention is to avoid these drawbacks and to provide a compact linear motor of high thrust.

It is another object of the invention to create a linear motor in which the magnetic field structure comprises wound sections substantially eliminating all passive flux closing yoke members so as to optimize the efficiency for a given dimension.

Another object of the invention is to reduce to a minumum value the inactive portion of the conductors of the magnetic field structure.

Still another object of the invention is to provide a linear motor having a wound magnetic field structure which will allow the speed of synchronization of the motor to be modified and the direction of operation to be reversed.

Other advantages and characteristics of the invention will become evident from the following description of two embodiments of the invention given by way of illustration only and shown in the accompanying drawings in which.

Figure 1:
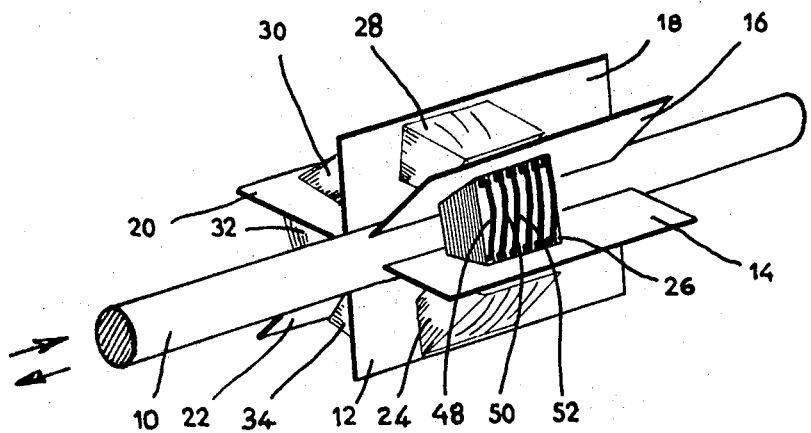
FIG. 1 is a schematic perspective view of a linear motor according to the invention in which the housing and the guide elements have been removed.
Figure 2:
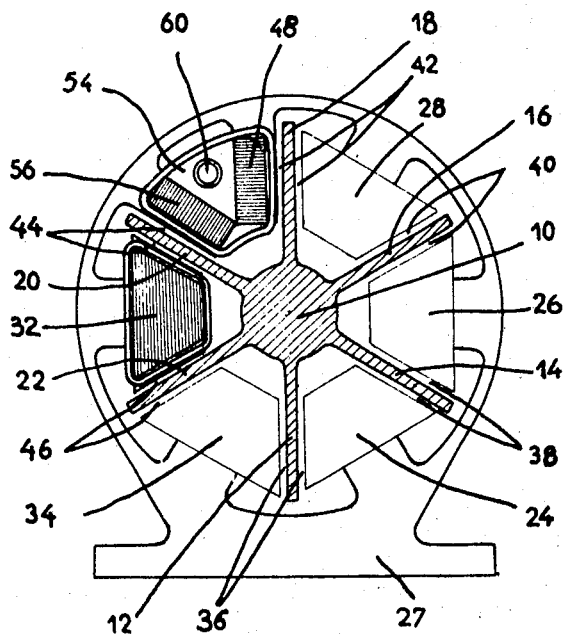
FIG. 2 is a front view of the motor of FIG. 1, a magnetic field element of which is shown hollow in accordance with an embodiment of the invention.

In the FIGS. 1 and 2, a rod-shaped movable support member 10 is slidably mounted in guides (not shown) and bears intermediate its ends a plurality of armature plates 12, 14, 16, 18, 20 and 22 in the form of fins of conductive material arranged radially in axial planes.

Between each pair of plates 12, 14, 16, 18, 20 and 22 is arranged a stationary magnetic field structure 24, 26, 28 30, 32 and 34 which are all secured in any desired manner to a casing 27 constituting the frame of the motor. Each circuit 24 and 34 has a prismatic shape of a length less than that of the fins 12 to 22 and a trapezoidal base converging towards the axis 10 so as to define air gaps 36, 38, 40, 42, 44 and 46 in the shape of slots which receive the plates 12 to 22. The magnetic core members 24 to 34 may advantageously be laminated in radial planes and bear polyphase ring windings such as 48, 50 and 52 staggered in the axial direction and connected, in a manner well-known to those skilled in the art, to a source of alternating current so as to produce a moving magnetic field which progresses in the axial direction of the motor. Reference may advantageously be had to the aforementioned French Patent for further details with regard to such ring windings and it is sufficient to point out that the active conductors of each winding extend substantially radially facing plates 12 to 22, whereby each winding cooperates with two armature plates disposed on opposite sides of its core member. Other types of windings, for instance lap or wave windings may of course be used.

The operation of the motor of the invention is obvious. The armature plates 12 to 22, which are subjected to the action of the magnetic flux traversing the respective air gaps, are the seat of induced current producing forces which act in the axial direction of the motor and the resultant of which is transmitted to the rod 10.

It should be noted that the inactive constituent elements of the motor are reduced to a minimum, each armature being subjected to the action of two field members. Furthermore, each field circuit participates on two of its faces in inducing armature currents the portion inactive of the conductors which corresponds to the circular connecting arcs or coil ends being reduced to a minimum. The resultant thrust is particularly high due to the large active air gap surfaces.

The closing of the magnetic flux takes place in the peripheral section of the magnetic field segments 24 to 34 opposite the corresponding armatures and the efficiency of the motor of the invention is not affected by the elimination of the magnetic material in the central portion of the magnetic circuits, for instance by the presence of passages through which a cooling fluid passes. One embodiment of such a hollow magnetic field structure 54 is illustrated in FIG. 2. Between two magnetic plates 56 and 58 adjacent the armature plates there is arranged a longitudinal slot or canal 60 in which a flow of cooling fluid is produced in an appropriate manner. This makes it possible to increase the current density in the conductors and therefore obtain an increased thrust without changing the size of the motor.

It is to be noted that the motor in accordance with the invention lends itself particularly well to modification of the speed of displacement by changing the pole pitch of the field windings and therefore has a wide range of application. This change of the pole pitch is effected by a simple switching of the connections of the rings in a manner described in the first Patent of Addition No. 92,630 of June 20, 1967 to the aforementioned French Pat. No. 1,474,072 to which reference may advantageously be had for further details.

Figure 3:
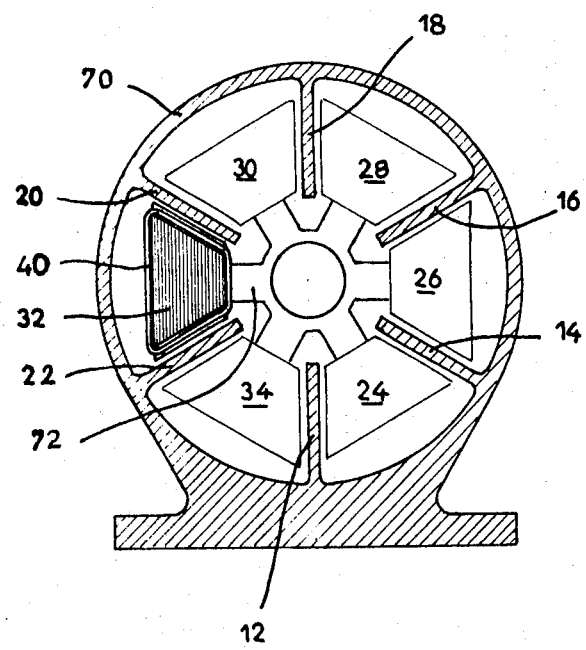
FIG. 3 is a partial view similar to that of FIG. 2 of another embodiment of the invention with armature plates rigidly connected to an outer casing.

FIG. 3 in which the same reference numbers, for reasons of clarity, designate parts identical or similar to those of FIG. 2, illustrates another embodiment of the invention with centripetal arrangement of the stationary armature plates 12 to 22 within a support 70. The field segments 24 to 34 are carried by a central element 72 and diverge centrifugally in a radial way. This reversed arrangement of the supports of the armatures and field structures changes in no way the operation of the motor of the invention.

The radial arrangement in accordance with the invention has been more particularly described in connection with a motor having a stationary annular field structure in the case of FIG. 2 and a stationary armature in the case of FIG. 3, but either of the embodiments can of course be applied with the same advantages whether the armature of the field structure is stationary. The number of phases of the windings as well as the type of these windings may of course be changed and guide devices prevent any rubbing between the armature plates and the field structures.

I claim:

1. A linear induction motor comprising an armature and a generally ring-shaped magnetic field structure relatively movable one with respect to the other, said armature comprising a plurality of radially extending fins of electrically conductive material, said magnetic field structure including a plurality of elementary multiphase wound magnetic field members extending between successive pairs of adjacent fins, respectively, to define a plurality of radially extending air gaps accommodation coextensive portions of said fins, respectively, along a major part of the radial length of said fins so that said elementary field members, when multiphase energized, produce axially moving magnetic fields in said air gaps causing axial relative movement of said armature and said magnetic field structure.

2. A motor according to claim 1, further comprising ring-shaped peripheral support means to carry said elementary magnetic field members.

3. A motor according to claim 1, further comprising ring-shaped peripheral support means to carry said fins, and axial support means to carry said elementary magnetic field members.

4. A motor according to claim 1, said elementary magnetic field members including magnetic core means filling in a major part of the wedge-shaped space included between said fins and carrying a ring winding having active conductors extending substantially along said major part of said radial length.

5. A motor according to claim 1, said elementary magnetic field members comprising longitudinal extending cooling conduits.

6. A linear induction motor comprising an armature having a plurality of planar radially extending fins of electrically conductive material, a generally wedge-shaped multiphase wound magnetic field member between each pair of adjacent fins to define a pair of opposed pole faces facing corresponding coextensive portions of confronting inner surfaces of said pair of adjacent fins, respectively, and spaced apart a small distance therefrom, said coextensive portions having a radial length constituting a major part of the total radial length of said fins, whereby said magnetic field member, when multiphase energized, produces a magnetic field axially progressing along said pole faces to cause axial relative movement of said armature and said magnetic field member.

7. A linear induction motor comprising an armature having a plurality of radially extending armature plates defining therebetween a plurality of intervals having a substantially sector-type cross section, a plurality of generally wedge-shaped multiphase wound magnetic field members inserted in said intervals, respectively, to define a plurality of radially extending pole faces closely spaced apart from said armature plates, said magnetic field members being substantially entirely located within said intervals, said magnetic field members being adapted to produce, when multiphase energized, adjacent said pole faces an axially progressing magnetic field causing axial relative movement of said armature and said magnetic field members.

8. A linear induction motor comprising an armature having a plurality of radially extending armature plates of electrically conductive material, a plurality of generally wedge-shaped multiphase wound magnetic field members inserted between each pair of said armature plates, each of said magnetic field members defining a pair of dihedral pole faces closely spaced apart from the corresponding pair of plates, said magnetic field members being substantially entirely accommodated between said armature plates, said magnetic field members being adapted to produce, when multiphase energized, adjacent said pole faces an axially progressing magnetic field causing axial relative movement of said armature and said magnetic field members.